Nov. 20, 1934.  T. DE C. TIFFT  1,981,128
ART OF CRACKING HYDROCARBONS
Filed April 24, 1931   2 Sheets-Sheet 1

INVENTOR
Thomas d'C. Tifft
BY
ATTORNEYS

Nov. 20, 1934. T. DE C. TIFFT 1,981,128
ART OF CRACKING HYDROCARBONS
Filed April 24, 1931 2 Sheets-Sheet 2
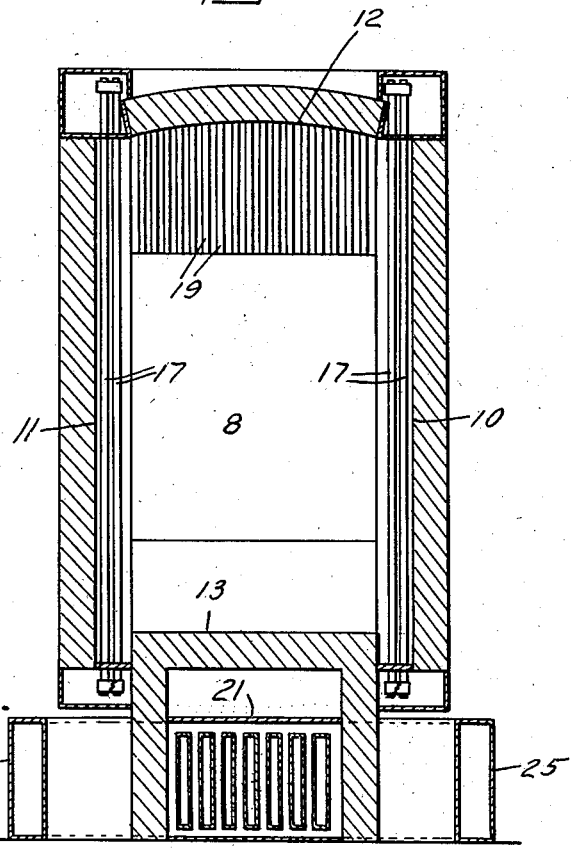
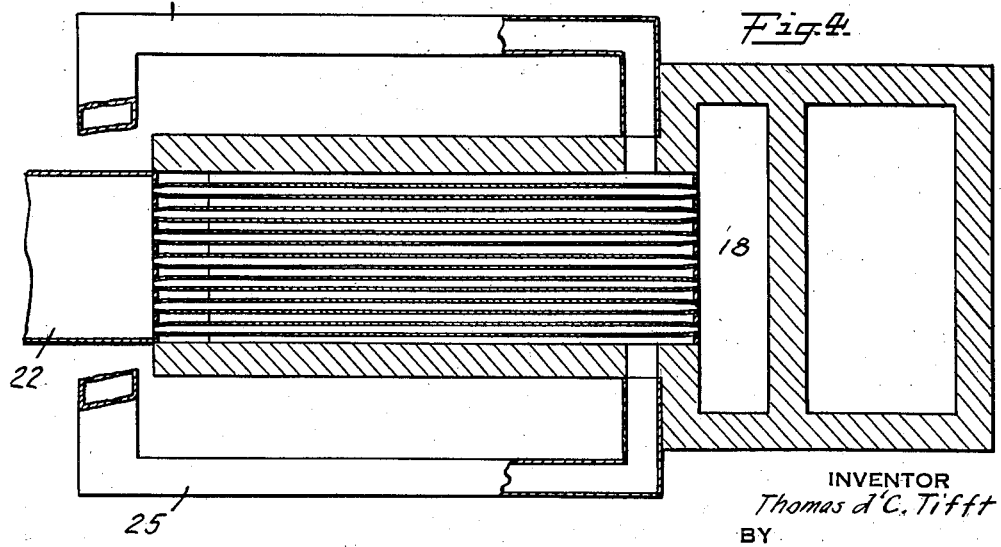
INVENTOR
Thomas d'C. Tifft
BY
Pennie, Davis, Marvin & Edwards
ATTORNEYS Patented Nov. 20, 1934

1,981,128

UNITED STATES PATENT OFFICE 1,981,128

ART OF CRACKING HYDROCARBONS

Thomas De Colon Tifft, Westfield, N. J., assignor to Sinclair Refining Company, New York, N. Y., a corporation of Maine Application April 24, 1931, Serial No. 532,415

2 Claims. (Cl. 196—116)

This invention relates to improvements in oil heating furnaces. The invention provides an oil heating furnace of special value and application in connection with cracking operations. The oil heating furnace of the invention, however, is of more general application.

Figure 1:
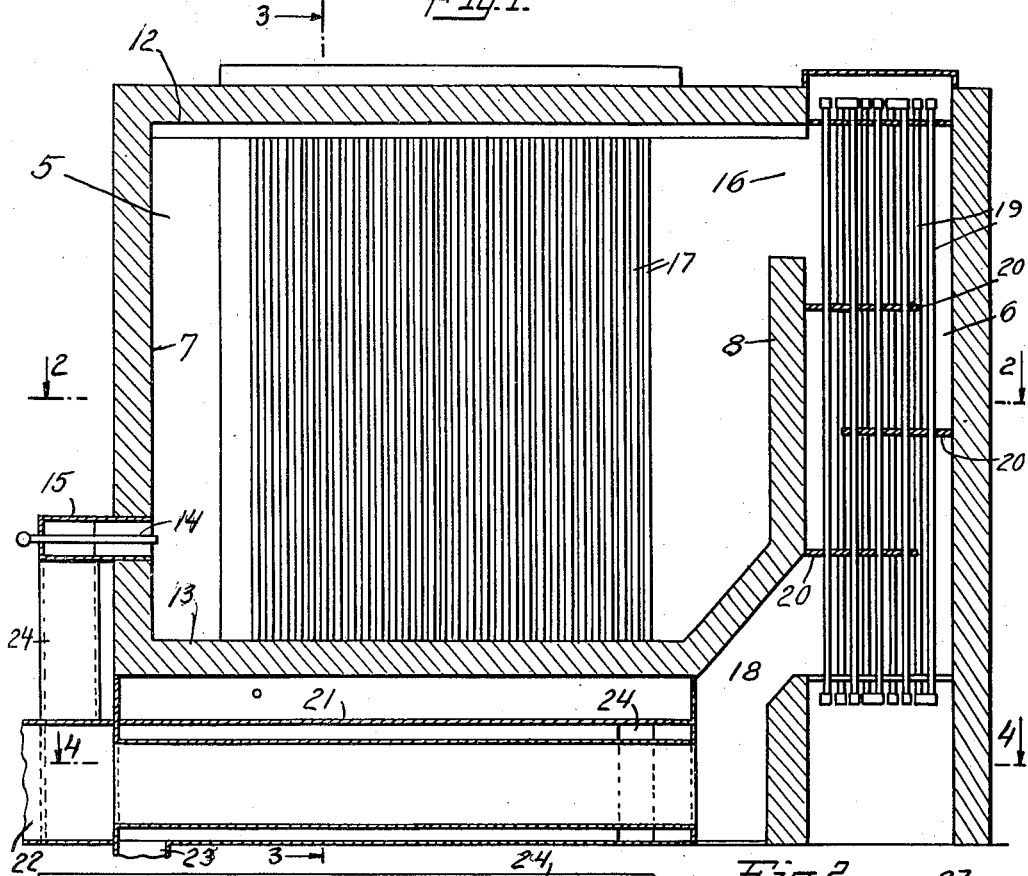
Figure 2:
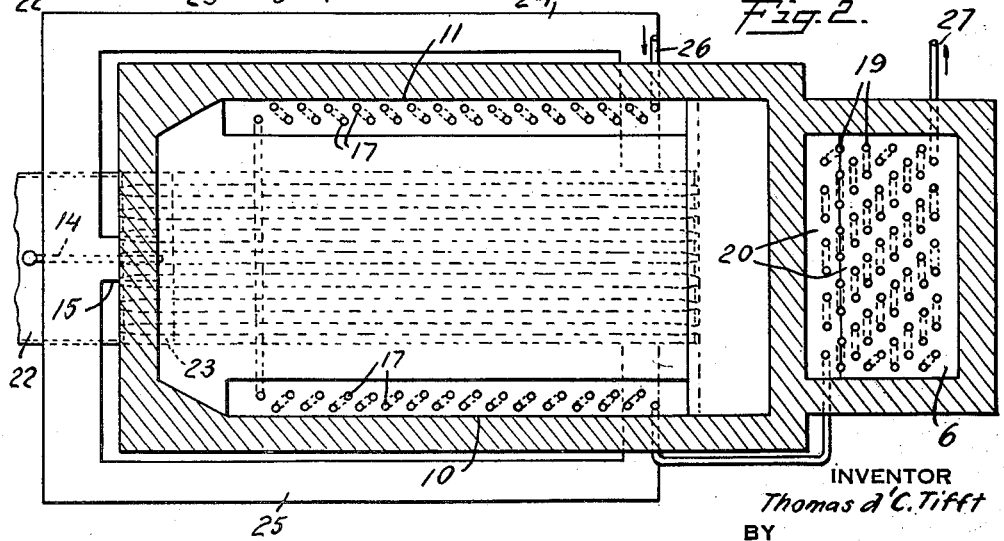

The accompanying drawings illustrate, diagrammatically but approximately to scale, an oil heating furnace embodying the invention. In the accompanying drawings, Fig. 1 is an elevation in section of the oil heating furnace, Fig. 2 is a section on line 2—2 of Fig. 1, Fig. 3 is a section on line 3—3 of Fig. 1 and Fig. 4 is a section on line 4—4 of Fig. 1.

The oil heating furnace illustrated comprises a heating and combustion chamber 5 and a heating flue 6, oil heating tubes being arranged both in the heating and combustion chamber 5 and in the heating flue 6. The present invention relates more particularly to the heating and combustion chamber and the arrangement of the oil heating tubes in it, but it also includes a special combination of the heating flue with the heating and combustion chamber.

The heating and combustion chamber 5 is generally rectangular in plan, being enclosed by relatively narrow end walls 7 and 8, relatively wide side walls 10 and 11, a roof 12 and a floor 13. By the terms "narrow" and "wide" as employed in describing the end walls and side walls of the combustion chamber, in the preceding sentence and throughout the specification and claims, reference is not made to the thickness of the walls but to the width of the surface of the end walls and side walls respectively which form the interior surfaces of the combustion chamber. The walls and roof and floor are constructed of the usual refractories. Means for supplying fuel and air, a gas burner 14 positioned in a duct 15 supplying preheated air for example, are arranged near the lower end of the end wall 7 and an exit flue 16 is arranged near the upper end of the end wall 8. The exit flue 16 may communicate with a stack flue through a variety of heat recovery means; in the furnace illustrated it communicates with the upper end of the heating flue 6.

A group of substantially vertical oil heating tubes 17 are arranged within the chamber 5 except that the tubes extend above the roof of the chamber and below the floor of the chamber. These tubes are disposed along each of the side walls 10 and 11. These heating tubes 17 shield a large proportion of the total area of the side walls 10 and 11 from radiant heat originating within the heating and combustion chamber 5. The end walls 7 and 8 and the roof 12 and the floor 13, however, are not so shielded with respect to such radiant heat.

The heating and combustion chamber 5 is proportioned with respect to the number and arrangement of the heating tubes 17 so that the aggregate unshielded area of the end walls 7 and 8 and the roof 12 and floor 13 is not substantially less than the aggregate shielded area of the side walls 10 and 11. The unshielded area may approximately equal the shielded area or the unshielded area may somewhat exceed the shielded area.

For example, the heating and combustion chamber 5 of the oil heating furnace illustrated may be approximately 10 feet wide, 25 feet long and 20 feet high, the heating tubes 17 shielding an area approximately 20 feet wide and 20 feet high on each side wall of the heating and combustion chamber 5.

In the oil heating furnace of the invention, the unshielded area of refractories within the heating and combustion chamber affords heat storage capacity sufficient with respect to the heat absorbing capacity of the oil heating tubes to minimize variation in the rate of heat absorption by the oil heating tubes because of momentary variations in the calorific value of the fuel supplied or the rate of fuel supply, for example. An important improvement in uniformity of operation is thus accomplished. Through the same factors, control is simplified and rendered smoother.

The arrangement of the heating tubes in groups along the inside of the side walls of the heating and combustion chamber makes possible an arrangement, such as that illustrated, affording ready access to the ends of the heating tubes, simplifying cleaning operations and making it possible to remove and replace individual tubes with relative ease. The furnace structure, moreover, is compact with respect to capacity and with respect to the total volume of the combustion space afforded in proportion to capacity.

In the oil heating furnace illustrated, a generally vertical heating flue 6 is connected at its upper end to an exit flue 16 and at its lower end to a stack flue 18. A group, or battery, of substantially vertical heating tubes 19 is arranged in the heating flue 6. Baffles 20 are provided to cause the combustion gases to pass back and forth across the heating flue 6 as they travel generally downwardly from the exit flue 16 through the heating flue 6 to the stack flue 18.

The group of heating tubes 19, absorbing heat primarily as sensible heat, is embodied in a particularly advantageous furnace arrangement in the furnace illustrated. So arranged in the heating flue 6 in conjunction with the heating tubes 17 arranged in the heating and combustion chamber 5, the heating tubes 19 afford an advantageous means of heat recovery from the combustion gases escaping through the exit flue 16 with a minimum requirement of space, thus furthering the advantages of the invention in providing an oil heating furnace compact with respect to capacity.

In the oil heating furnace illustrated, the combustion gases escaping through stack flue 18 pass through the air heater 21 positioned beneath the heating and combustion chamber 5, escaping from the air heater 21 through flue 22. Air is supplied to the air heater 21 through duct 23, by means of an appropriate fan or blower, and escapes from the air heater 21 through ducts 24 and 25 communicating with the duct 15. The air heater illustrated is of conventional plate type.

In application of the oil heating furnace of the invention in connection with cracking operations, the oil, for example, may be supplied through connection 26, circulated serially first through the heating tubes 17 and then through the heating tubes 19 and discharged through connection 27, the oil thus being brought quickly to a high temperature in the heating tubes 17 and maintained at that temperature or the temperature may still be increasing but at a lower rate in the heating tubes 19. In connection with operations in which oil is to be heated to a high temperature with maintenance of the oil at the maximum temperature for but a minimum period of time, to avoid substantial cracking, the oil, for example, may be supplied through connection 27, circulated serially first through the heating tubes 19 and then through the heating tubes 17 and discharged through connection 26.

I claim:

1. In apparatus for heating oil at least to a cracking temperature, a furnace comprising a heating and combustion chamber generally rectangular in plan, means for supplying fuel and air near the lower end of one of the narrow end walls of said chamber, an exit flue for combustion gases near the upper end of the other narrow end wall of said chamber, a group of substantially vertical heating tubes arranged within said chamber adjacent each of the wide side walls of said chamber, said tubes extending above the roof and below the floor of said chamber, the roof and the floor and said narrow end walls of said chamber having an aggregate unshielded area not substantially less than the area of said side walls of said chamber shielded by said heating tubes.

2. In apparatus for heating oil at least to a cracking temperature, a furnace comprising a heating and combustion chamber generally rectangular in plan, means for supplying fuel and air near the lower end of one of the narrow end walls of said chamber, an exit flue for combustion gases near the upper end of the other narrow end wall of said chamber, a group of substantially vertical heating tubes arranged within said chamber adjacent each of the wide side walls of said chamber, said tubes extending above the roof and below the floor of said chamber, the roof and the floor and said narrow end walls of said chamber having an aggregate unshielded area not substantially less than the area of said side walls of said chamber shielded by said heating tubes, a generally vertical heating flue connected at its upper end with said exit flue and at its lower end to a stack flue and a group of substantially vertical heating tubes arranged in said heating flue.

THOMAS DE COLON TIFFT.